Oct. 28, 1969  E. CARNALL, JR., ET AL  3,475,116

HOT PRESSED CADMIUM TELLURIDE

Filed April 23, 1965

EDWARD CARNALL, JR
WILLIAM F. PARSONS
DONALD W. ROY
INVENTORS

BY *R. Frank Smith*
*Thomas W. O'Rourke*

ATTORNEYS

United States Patent Office 3,475,116
Patented Oct. 28, 1969

3,475,116
HOT PRESSED CADMIUM TELLURIDE
Edward Carnall, Jr., William F. Parsons, and Donald W. Roy, Rochester, N.Y., assignors to Eastman Kodak Company, Rochester, N.Y., a corporation of New Jersey
Filed Apr. 23, 1965, Ser. No. 450,363
Int. Cl. C01b *19/00;* C01g *11/00*
U.S. Cl. 23—50                         2 Claims

ABSTRACT OF THE DISCLOSURE

An article of manufacture comprising hot pressed polycrystalline cadmium telluride having a density at least 99% of theoretical, and having specular transmittance in the infrared range of the electromagnetic spectrum.

---

Figure 1:
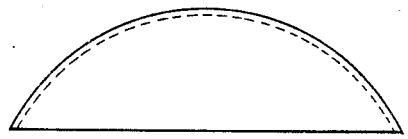

This invention relates to an optical element having desirable strength and stability, and to the method for making such elements. More particularly, the invention pertains to an article of cadmium telluride comprising substantially voidlessly fused powdered particles displaying optical homogenity and a broad range of infrared transparency.

While a number of materials which transmit infrared radiation are known, the range of desirable properties available to a designer are still quite limited. A large number of the known materials display inherent shortcomings which limit their usefulness in contemporary applications such as heat-seeking guidance devices in missiles and aircraft fire control systems. It is apparent that present demands require infrared transmitting optical elements better than the rock salt lens disclosed in U.S. Patent No. 2,642,267.

An infrared transmitting element in an air-to-air missile, for example, will be exposed to extremes in atmospheric conditions, air friction and temperature change. The air friction and temperature change considerations impose substantial problems while the missile is merely being transported by a supersonic interceptor, but conditions are even more extreme during the critical time when the missile is fired and travels at speeds many times the speed of sound.

A known type of infrared transmitting element is the single crystal form of certain limited substances. The single crystal form is considered to include joined, similarly oriented macro crystals. This form is generally used only in laboratory equipment where size requirements are moderate. It is well known that single crystals often display planes of cleavage which make them susceptible to breakage by even a small force applied parallel to the plane of cleavage. These same planes of cleavage usually make it extremely difficult to grind or otherwise form single crystals into the more common shapes of optical elements, such as lenses or domes. Single crystals of substantial size are difficult and expensive to produce. Even when a large single crystal is successfully grown, it must be treated as a valuable object and may display a tendency to break along its planes of cleavage.

When a material which transmits infrared radiation in the single crystal form is recast in the more durable and workable polycrystalline form by melting and cooling, internal strains and voids often severely curtail infrared transmittance in the melt-cooled polycrystalline form. Melt-cooled polycrystalline article consists of crystallites formed around random nuclei. The crystallites vary in size as a result of growing until hindered by a neighboring crystallite. Imperfect crystallization or voids may exist at the strained interfaces between crystallites. Such voids function as scattering sites for infrared radiation and negate the infrared properties of the material.

Glasses usually do not transmit infrared radiation over a substantial part of the infrared spectrum and are not crystalline. Therefore, there is little use of glass to transmit infrared radiation other than in the 2–4 microns range.

According to the instant invention, superior infrared transmitting optical elements of cadmium telluride are produced by subjecting powdered particles of the material to conditions of relatively high temperature and pressure under inert conditions. The temperatures under which the elements of the instant invention are produced must be below the melting temperature of the cadmium telluride, but must be high enough to permit plastic deformation of the powdered particles under the high pressure applied. A critical temperature range peculiar to cadmium telluride is thus involved. Similarly, there is a critical threshold pressure for hot pressing cadmium telluride. This combination of relatively high temperatures and pressures permit the powdered particles to plastically deform, without destroying the crystalline lattice thereof, in order to accommodate and join to one another in a substantially voidless manner. The powdered particles can, for the most part, be considered to be individual crystallites. It is apparent that the voidless articles will be a polycrystalline and of substantially theoretical density.

The polycrystalline element produced according to the present invention is substantially voidless and, therefore, contains no noticeable infrared radiation scattering sites. This permits the cadmium telluride polycrystalline article to transmit infrared radiation. It is necessary that the polycrystalline article be at least 99% of theoretical density if the desirable infrared transmittance is to be attained.

It is preferable that the cadmium telluride crystalline elements be produced from powdered particles of substantially the same nature. Thus, since each powdered particle can be considered as a crystallite, the present element is substantially homogeneously polycrystalline. That is, each continuous crystalline area corresponds substantially to an original powdered particle and, since original powdered particle was substantially the same as the each other powdered particle, each crystalline area will correspond substantially to each other crystalline area. Even the small crystallites in the polycrystalline element of the instant invention display the planes of cleavage which are so detrimental to large single crystals or macro crystal articles. However, if a failure is initiated along the plane of cleavage of a crystallite of a hot pressed cadmium telluride article, such failure is arrested at the interface between that crystallite and an adjoining crystallite which would, in all probability, have its plane of cleavage differently oriented.

Single crystal materials have phenomenal strength in most directions, but are often fragile through their planes of cleavage. In effect, the instant invention averages the properties of the single crystal so that the hot pressed polycrystalline article displays substantially equal properties without regard to orientation. Of course, the above-discussed arrest of incipient failures at crystalline interfaces also enhances the properties of the hot pressed polycrystalline article.

An inert closed die is used to confine the cadmium telluride powder particles while subjecting the charge to conditions of relatively high temperatures and high pressure conditions. Since the charge consists of powdered particles, it will readily adapt to substantially the shape defined by the pressing die before pressing. After pressing, it will accurately conform to the shape of the die. Thus, the present invention provides versatility in producing optical elements in shapes of lenses, domes, or other configurations required by the art. If the die is accurately formed and carefully polished, the pressed cadmium telluride element will require little or no further working after pressing. However, if desired, the hot pressed polycrystalline infrared transmitting cadmium telluride elements of the instant invention may be pressed in blank or rough form and worked with conventional optical glass forming and polishing methods that would disintegrate single crystal materials.

According to the present invention, the cadmium telluride powder is heated to a temperature within the critical range of from 500 to 1000° C. The preferred range in 600 to 850° C. While at a temperature within this range, the powder is subjected to pressure of at least 15,000 p.s.i. This is preferably done under a vacuum or in an inert atmosphere. Higher pressures are operable but do not result in improved properties. Pressure and temperature are maintained at least three minutes and preferably for ten minutes or longer. At times less than ten minutes, the properties of the cadmium telluride element may not be optimum as a result of incomplete pressing.

The cadmium telluride powder is preferably subjected to a cold pressing operation before being hot pressed. Cold pressing should be at a temperature of at least 100 p.s.i. It is the purpose of the cold pressing to compact the powder and improve heat transfer.

Figure 2:
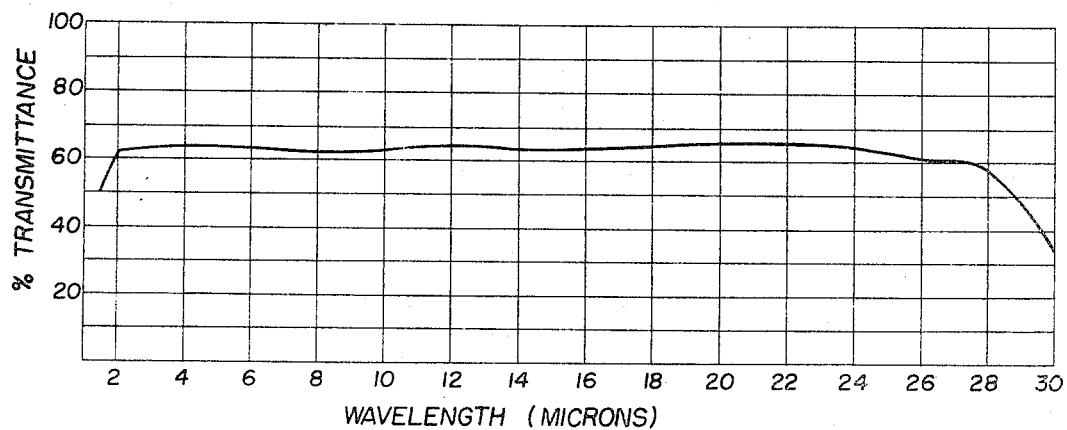

The invention will be further understood by reference to the following detailed description and drawing in which:

FIG. 1 is a view of an infrared transmitting polycrystalline solid dome formed of cadmium telluride; and FIG. 2 is a graph illustrating the external transmittance of hot pressed cadmium telluride.

The dome of cadmium telluride shown in FIG. 1 illustrates the convenient shapes into which cadmium telluride can be hot pressed according to the present invention.

FIG. 2 is a graph wherein the percent external transmittance of hot pressed cadmium telluride is plotted as the ordinate and the wavelentgh of radiation tested is plotted as the abscissa. The sample tested was 2.020 inches in diameter and 0.125 inch thick. It should be noted that the curve is not corrected for reflection loss. Such reflection loss amounts to 33 to 36% and may be avoided by coating the hot pressed elements with known antireflective layers. As is apparent from the graph, cadmium telluride hot pressed elements display broad infrared transmission which, if corrected for reflection, approaches unity from 2 microns wavelength through 28 to 30 microns wavelength. Transmission without correction for reflection losses is greater than 60% in the range of 2–25 microns.

Pressing can be carried out in any apparatus capable of generating sufficient force produced pressure at least 15,000 p.s.i. or higher, for a given die. The die should be inert to cadmium telluride and may be produced of carbon or high temperature alloys. Foils of inert metals may be used to line the die.

The die should be enclosed and capable of maintaining an inert atmosphere or vacuum during pressing. Heating is preferably by electrical means utilizing induction. If the dies are produced of a material which does not properly couple with the field, it may be encased in a material, such as graphite, which will efficiently produce the desired heat.

Pure cadmium telluride is the preferred material. However, impurities do not generally detract from the strength of the article but only introduce adsorption bands which curtail infrared transmission at given wavelengths. Thus, for certain uses for which the strength of the article is more important than infrared transmission, impurities can be tolerated.

A cadmium telluride element produced by pressing at a temperature between 500 to 1100° C. at a pressure of at least 15,000 p.s.i. while under a vacuum or in an inert atmosphere displays specific transmittance as shown in FIG. 2. Further, it displays the following physical properties:

TABLE I.—YOUNGS MODULUS OF ELASTICITY AND MODULUS OF RUPTURE

| Temperature, ° C.: | Modulus of Elasticity, p.s.i.×10⁶ | Modulus of Ruptures p.s.i. |
| --- | --- | --- |
| −196 | 5.7 | 4,580 |
| 25 | 4.4 | 3,820 |
| 100 | 3.6 | 5,720 |

TABLE II.—THERMAL CONDUCTIVITY

| Temperature (° C.): | Cal. cm./sec. cm.² ° C. |
| --- | --- |
| −40 | 0.013 |
| 20 | 0.0098 |
| 100 | 0.0088 |

TABLE III.—REFRACTIVE INDEX OF HOT-PRESSED CdTe

| Wavelengths (microns): | Refractive index |
| --- | --- |
| 1.0 | 2.839 |
| 1.5 | 2.745 |
| 2.0 | 2.714 |
| 3.0 | 2.696 |
| 4.0 | 2.689 |
| 5.0 | 2.685 |
| 6.0 | 2.682 |
| 7.0 | 2.680 |
| 8.0 | 2.678 |
| 9.0 | 2.675 |
| 10.0 | 2.673 |

TABLE IV.—MISCELLANEOUS PROPERTIES

Color: Black. Coefficient of thermal expansion $5.7 \times 10^{-6}$ ° C. over range −196° C. to 100° C.
Density: 5.851 grams/cc. Melting point 1091° C.

The unusual physical properties of the cadmium telluride infrared transmitting element will be readily appreciated in view of the following examples.

Example 1

Cadmium telluride infrared transmitting optical element is produced by pressing substantially pure cadmium telluride powder at a temperature within 500 to 1000° C. at a pressure of at least 15,000 p.s.i. resulting in an article which is at least 99% of theoretical density and displays infrared transmission illustrated in FIG. 2.

Example 2

The article of Example 1 having a diameter of 2.020 inches and a thickness of 0.145 inch was dropped, while at room temperature, into liquid nitrogen at a temperature of −196° C. without adverse affect.

Example 3

The article of Example 1 having a diameter of 2.020 inches and a thickness of 0.145 inch was quenched from 330° F. to 75° F. without adverse affect.

Example 4

The article of Example 1 was exposed to 96% relative humidity at 96° F. temperature for 11 days with no change in transmittance.

Example 5

The article of Example 1 was maintained at a tempetrature of 570° F. for 16 hours with no change in transmittance.

Example 6

The article of Example 1 was maintained at 660° F. for 16 hours and developed a light gray coating on the surface. A series of absorption bands in the transmittance between 13 to 30 microns wavelength occurred.

Example 7

The article of Example 1 was placed in a 100 microns vacuum maintained at 570° F. for 7 hours with no change in transmittance.

Example 8

The article of Example 1 was placed in a 100 microns vacuum at a temperature of 750° F. Thermal etching appeared after 5 minutes.

The above description and examples clearly demonstrate the great resistance to thermal shock as well as the other exceptional properties such as the modulus of elasticity displayed by the cadmium telluride article.

The invention has been described in detail with particular reference to preferred embodiments thereof, but it will be understood that variations and modifications can be effected within the spirit and scope of the invention as described hereinabove and as defined in the appended claims.

We claim:

1. An article of manufacture consisting essentially of an optically homogeneous polycrystalline solid of joined cadmium telluride particles, said article having a density in the range of at least 99% up to and including theoretical density, said article being black in color, and said article transmitting well in the electromagnetic spectrum from 2–30 microns and being characterized by specular transmission such that a sample 0.125 inch thick exhibits transmission in the range of 2 to 25 microns greater than 60% without correction for reflection losses.

2. An article of manufacture in accordance with claim 1 hot pressed from particles of powder size at a pressure of at least 15,000 p.s.i. and a temperature between 500 and 1100° C.

References Cited

UNITED STATES PATENTS

| | | | |
|---|---|---|---|
| 3,131,025 | 4/1964 | Carnall et al. | 23—135 |
| 3,131,238 | 4/1964 | Carnall et al. | 23—135 |

FOREIGN PATENTS

| | | |
|---|---|---|
| 620,659 | 11/1962 | Belgium. |
| 913,175 | 12/1962 | Great Britain. |

OTHER REFERENCES

Fischer—"Zeitschrift fur Naturforschung"—Bd. 13A, 1958, pp. 105 to 110. (Copy in Sci. Lib.).

Nitsche—"The Physics & Chemistry of Solids"—vol. 17, December 1960, pp. 163–165.

Nitsche et al.—"Journal of Physics & Chemistry of Solids"—vol. 21, 1961, pp. 199–205.

HERBERT T. CARTER, Primary Examiner

U.S. Cl. X.R.

23—293; 264—1